US011883700B1

(12) United States Patent
Broidy

(10) Patent No.: US 11,883,700 B1
(45) **Date of Patent: *Jan. 30, 2024**

(54) INTEGRATED PANEL FOR FIRE SUPPRESSION SYSTEM

(71) Applicant: Fire & Pump Service Group, Rancho Dominguez, CA (US)

(72) Inventor: Frank Broidy, Carson, CA (US)

(73) Assignee: FIRE & PUMP SERVICE GROUP, Rancho Dominguez (CA)

( * ) Notice: Subject to any disclaimer, the term of this patent is extended or adjusted under 35 U.S.C. 154(b) by 323 days.

This patent is subject to a terminal disclaimer.

(21) Appl. No.: 16/926,793

(22) Filed: Jul. 13, 2020

Related U.S. Application Data

(63) Continuation of application No. 15/183,734, filed on Jun. 15, 2016, now Pat. No. 10,709,916, which is a continuation of application No. 13/873,143, filed on Apr. 29, 2013, now Pat. No. 9,393,451.

(60) Provisional application No. 61/639,844, filed on Apr. 27, 2012.

(51) Int. Cl.
*A62C 35/13* (2006.01)

(52) U.S. Cl.
CPC .................................... *A62C 35/13* (2013.01)

(58) Field of Classification Search
CPC ....... A62C 35/20; A62C 35/13; A62C 35/023; A62C 13/76; A62C 13/78; A62C 35/58; A62C 35/68; A62C 35/00; A62C 3/00; A62C 3/002; A62C 99/00; A62C 2/00; A62C 2/246; A62C 2/247; A62C 31/28; A62C 33/00; A62C 33/04
USPC ...................... 169/51, 48, 49, 54, 70, 60, 61
See application file for complete search history.

(56) References Cited

U.S. PATENT DOCUMENTS

| | | | | |
|---|---|---|---|---|
| 2,287,873 | A | 6/1942 | Geertz | |
| 3,097,499 | A * | 7/1963 | Rodgers et al. | F17C 13/04 62/50.1 |
| 3,878,896 | A | 4/1975 | White et al. | |
| 3,977,474 | A | 8/1976 | Boegli | |
| 4,174,711 | A * | 11/1979 | Laing | A62B 11/00 220/900 |
| 4,356,870 | A | 11/1982 | Gaylord et al. | |
| 4,819,732 | A | 4/1989 | Laumeister | |
| 5,061,022 | A * | 10/1991 | Meriwether | E05F 5/12 49/367 |
| 5,560,693 | A | 10/1996 | Musser | |
| 5,808,541 | A | 9/1998 | Golden | |
| 5,850,876 | A * | 12/1998 | Allison | A62C 35/62 169/61 |
| 7,264,178 | B1 | 9/2007 | Hugg | |
| 7,775,292 | B1 | 8/2010 | Romanco | |
| 8,230,939 | B1 | 7/2012 | Renolds | |

(Continued)

*Primary Examiner* — Christopher R Dandridge
(74) *Attorney, Agent, or Firm* — Buchalter, APC

(57) ABSTRACT

The present system provides an integrated fire suppression system that includes all components in a single integrated panel, other than system piping to nozzles or emitters. The system enables the entire panel to be inspected and analyzed, and installed, repaired, or maintained in a single operation, dramatically reducing time spent on site and reducing the qualifying process as well. The assembly of the panel is off-site, typically under the inspection of any qualifying agencies. Once assembled, the system can remain qualified for rapid installation at any future time, allowing easy replacement of faulty panels or consumables.

20 Claims, 3 Drawing Sheets

(56) References Cited

U.S. PATENT DOCUMENTS

| | | | | |
|---|---|---|---|---|
| 8,973,670 | B2 | 3/2015 | Enk, Sr. | |
| 10,709,916 | B2 * | 7/2020 | Broidy | A62C 35/68 |
| 2006/0005880 | A1 * | 1/2006 | Baker | A62C 33/00<br>137/355.16 |
| 2007/0103325 | A1 | 5/2007 | Wagner | |
| 2011/0121034 | A1 | 5/2011 | Swab | |

* cited by examiner

INTEGRATED PANEL FOR FIRE SUPPRESSION SYSTEM

CROSS-REFERENCE TO RELATED APPLICATIONS

This patent application is a continuation of U.S. patent application Ser. No. 15/183,734 filed Jun. 15, 2016, now U.S. Pat. No. 10,709,916, and Ser. No. 13/873,143 filed Apr. 29, 2013, now U.S. Pat. No. 9,393,451, both entitled "INTEGRATED PANEL FOR FIRE SUPPRESSION SYSTEM, "and which claim the benefit of priority of U.S. Provisional Patent Application No. 61/639,844 of the same title and filed Apr. 27, 2012, each of which is incorporated by reference herein in their entirety.

BACKGROUND

Certain installations require, by statute, code, or for some other reason, that built in fire suppression systems be provided. In some cases, these systems comprise a simple water sprinkler system that is activated via some environmental trigger (e.g. heat, smoke, and the like). In other cases, more complex systems are required that must meet certain standards for performance and must also pass certain standards of construction and installation. In some cases, there may be regulations for any and all equipment, whether related to the fire suppression system or not.

In the prior art, certain complex fire suppression systems have typically been component based, where each component of the system is installed separately and combined with other components to provide the required fire suppression capability. There are a number of disadvantages of such an approach.

In cases where all materials have to be graded and approved, each separate component must pass the review process prior to installation. This can take a significant amount of time, severely delaying installation of original systems, or repair of existing systems. Often the sources of the components in the prior art are separate and independent companies, adding to the expense and delay of installation.

One particular environment where such prior art systems suffer from sever disadvantages is the nuclear industry. There are strict requirements (e.g. Nuclear Quality Assurance level 1, "NQA-1) that each component must meet. With each component being installed by a different team, the man-hours required for installation, maintenance, and repair are multiplied. Any work at a nuclear site must be supervised by a security team. The component system requires a large security team working many hours during all processes. This adds overhead, cost, and scheduling complexity to the process.

Even in non-nuclear environments, building and safety codes may require inspection, certification, UL approval, and/or other conditions to be satisfied prior to installation and operation of the system.

FIG. 1 is an example of a prior art component based system. The system includes a plurality of tanks 101. These tanks can contain some fluid or gas to be used with the fire suppressions system. Each tank requires a space in a mounting rack and coupling through piping to the remainder of the system. At some other location a control panel 102, for controlling fluid flows and mixing of water from water tank 106 and the material from tanks 101, is installed on the wall or in some desired location. The component system may also include back up battery power 103, FACP panel 104, and auxiliary power supply 105. A water drain 107 is included in the system, along with piping 108 and 109 to emitters or nozzles for dispersing the combined fluids as appropriate.

SUMMARY

The present system provides an integrated fire suppression system that includes all components in a single integrated panel. The system allows the entire panel to be inspected and analyzed, and installed, repaired, or maintained in a single operation, dramatically reducing time spent on site and reducing the qualifying process as well. The assembly of the panel is off-site, typically under the inspection of any qualifying agencies. Once assembled, the system can remain qualified for rapid installation at any future time, allowing easy replacement of faulty panels or consumables. The system allows plug and play capability during installation and/or replacement operations. The panel includes a surrounding cabinet, with lockable doors to restrict access to the interior of the cabinet to qualified personnel. Inside, the cabinet defines a plurality of spaces that are designed to provide stability, easy operation and repair, and containment of many errors and failures to specific compartments, protecting other components. The design of the overall system is such to provide a low center of gravity to increase the stability of the cabinet even in the absence or failure of mounting straps. The design is such that even when mounted, the pressures on the mounts are reduced due to the natural stability of the cabinet.

DETAILED DESCRIPTION OF THE SYSTEM

Figure 2:
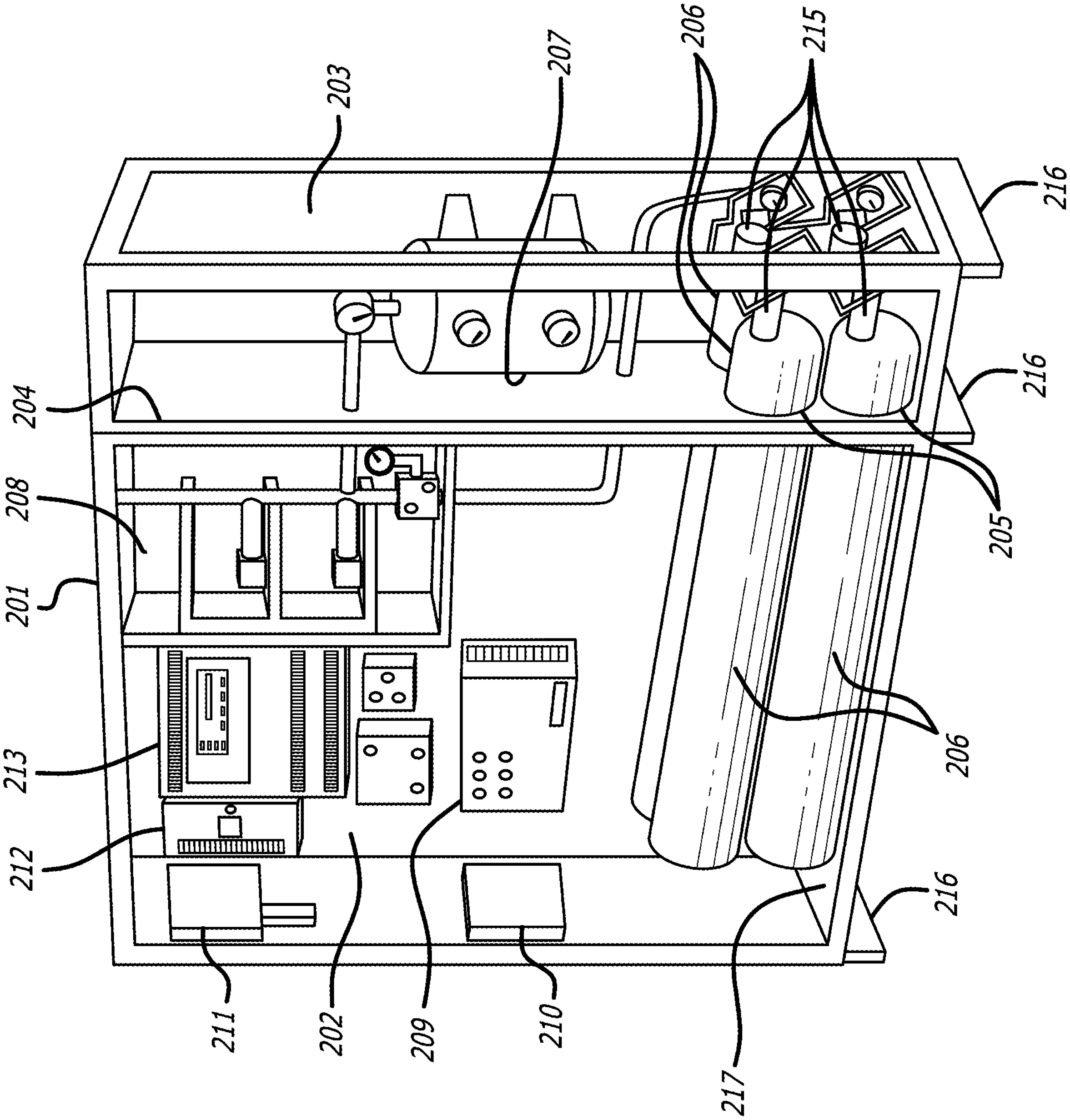
FIG. 2 is an embodiment of the system.

The system provides a unitized, compact, modular scalable set of cabinetry for containing fire suppression equipment. An example of an embodiment of the system is illustrated in FIG. 2. The cabinet 201 is substantially rectangular and comprises a plurality of compartments such as compartments 202, 203, and 208 for receiving and isolating various components of the system. More compartments can be provided without departing from the scope and spirit of the system. The cabinet includes feet 216 that lift the bottom 217 of the cabinet above ground level to protect the interior from fluid leaks, dirt, dust, and other foreign substances after installation. The example of FIG. 2 is shown without doors and side panel to illustrate the interior configuration of the cabinet.

In one embodiment the cabinet is comprised of steel with welded seams in addition to provide isolation of the interior components. The cabinet itself may be a UL approved cabinet for containing electronic components. The cabinet in one embodiment includes a first section that is 72H by 96W by 34D. A second section may be 72H, by 24W or wider by 34D and is scalable. The design of the cabinet 201 serves a number of functions. One function is to isolate and contain fire suppression equipment in a single integrated location. This allows the system to be assembled and certified off site, and then moved to the installation site while retaining all or most of the certification qualifications. Another function is to reduce the impact of various system failures from impacting the remainder of the system and causing additional damage. Another function is to allow for easy maintenance and repair of the system in place.

The separation of regions of the cabinet into compartments adds to the effectiveness of the cabinet. Compartments 202 and 203 provide locations for various subsystems of the fire suppression system. Compartments 202 and 203 are separated by a wall 204 that includes openings 205 for the heads of the high pressure gas tanks 206 to extend into region 203. This unique design separates potential fluid leaks of the water tank and/or nozzles from sensitive instruments and controllers in region 202. Should the nozzles 215 on the gas tanks 206 fail, and/or should the water tank 207 leak, the fluid will be isolated and contained in region 203, protecting other equipment in the cabinet. The openings 205 that permit the tops of the tanks 206 to extend into region 203 can include gasket, grommets, and/or other sealing mechanisms to provide isolation between the compartments. The gas tanks 206 may be nitrogen tanks for use in a water/nitrogen fire suppression system or other chemical or inerting gases.

Figure 1:
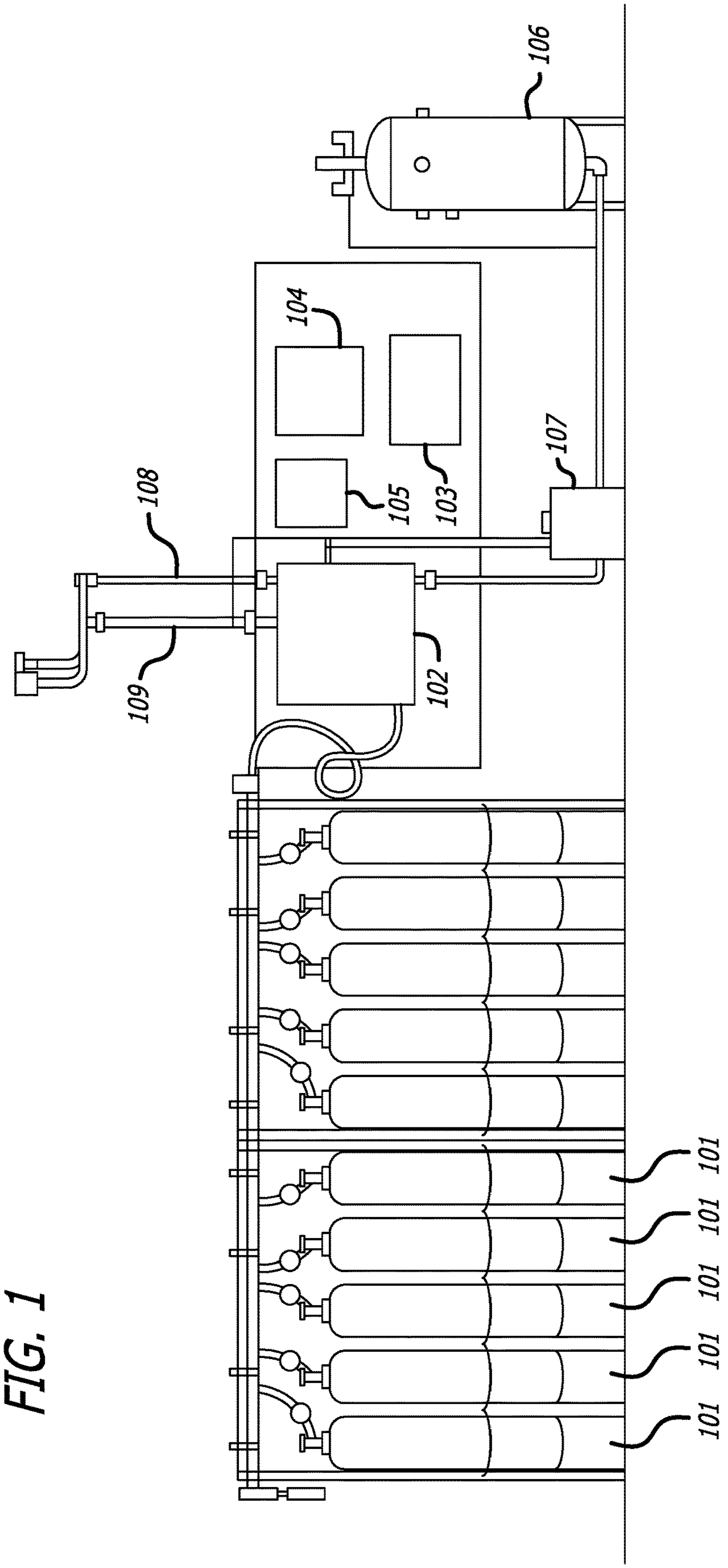
FIG. 1 is an example of a prior art system.

Another advantage of the design of the cabinet is natural stability. The cabinet is designed for heavier components to be at the bottom of the cabinet and for those components themselves to be in their most stable configuration. For example, the gas tanks 206 are located in a more stable arrangement than typical vertical wall racks (such as shown in FIG. 1). The center of gravity of the tanks is such that the tanks are already at a stable location (whereas vertical tanks could fall down). The tanks comprise the heaviest component of the system. In the event of an earthquake, the heavy tanks are already stabilized through this design. In addition, the tanks 206, being the heaviest item in the integrated cabinet, provide stability to the cabinet overall which is part of the earthquake readiness of the system. The tanks can be installed vertically upright in one embodiment, whereby, the profile would be lessened.

The system includes valves and solenoids in compartment 208, also in a defined space with walls around the region. This area is another area of potential leaks, so by keeping it separated from other electrical components with the physical barrier of compartment 208, robust protection is provided to the system. In one embodiment, compartment 208 may have its own door to provide further isolation of the components. In one embodiment, compartment 208 is located within compartment 203 to isolate fluid related components in a single location. In one embodiment, enclosure 203 contains a control system for an emitter based system such as the Vortex system manufactured by Victaulic. Such systems provide a water-sparse solution for fire suppression, using high velocity, low pressure discharge. It should be noted that the system may be implemented with any manufacturer's components.

Electrical control components 209-213 are provided in the remainder of the cabinet 201, mounted securely per IBC or NQA-1 requirements in compartment 202. All connections between the components in the panel are already made at the manufacturing location. In one embodiment, the panel communicates with the remainder of the system through a minimum of connection points. For example, the system includes a power interconnect, plumbing interconnect for integration with the fire suppression piping system, and a communications port (in addition to available wireless control as desired) and a BACnet gateway. These interconnects may be at the top, sides, and/or back of the cabinet as desired. In one embodiment, the connections are situated so as to be easily accessible during installation, operation, and maintenance of the system.

In one embodiment, the fittings of the cabinet connect to a piping system where nozzles may be distributed throughout the protected space. In another embodiment, the cabinet will include two phase fluid nozzles or emitters mounted on top of the cabinet itself, without the need for additional piping and plumbing. In this embodiment, the system is self-contained and no additional piping is required. The cabinet can be in wired or wireless communication with sensors and activate upon detection of an alarm condition.

In one embodiment, fluid connections are black steel, stainless steel, and fittings may be via malleable iron fittings (black or galvanized). All piping includes pipe hangers and support bracket to support the dead load of the piping system. Rigid support is provided at all direction changes as needed per local codes and authorities having jurisdiction.

Figure 3:
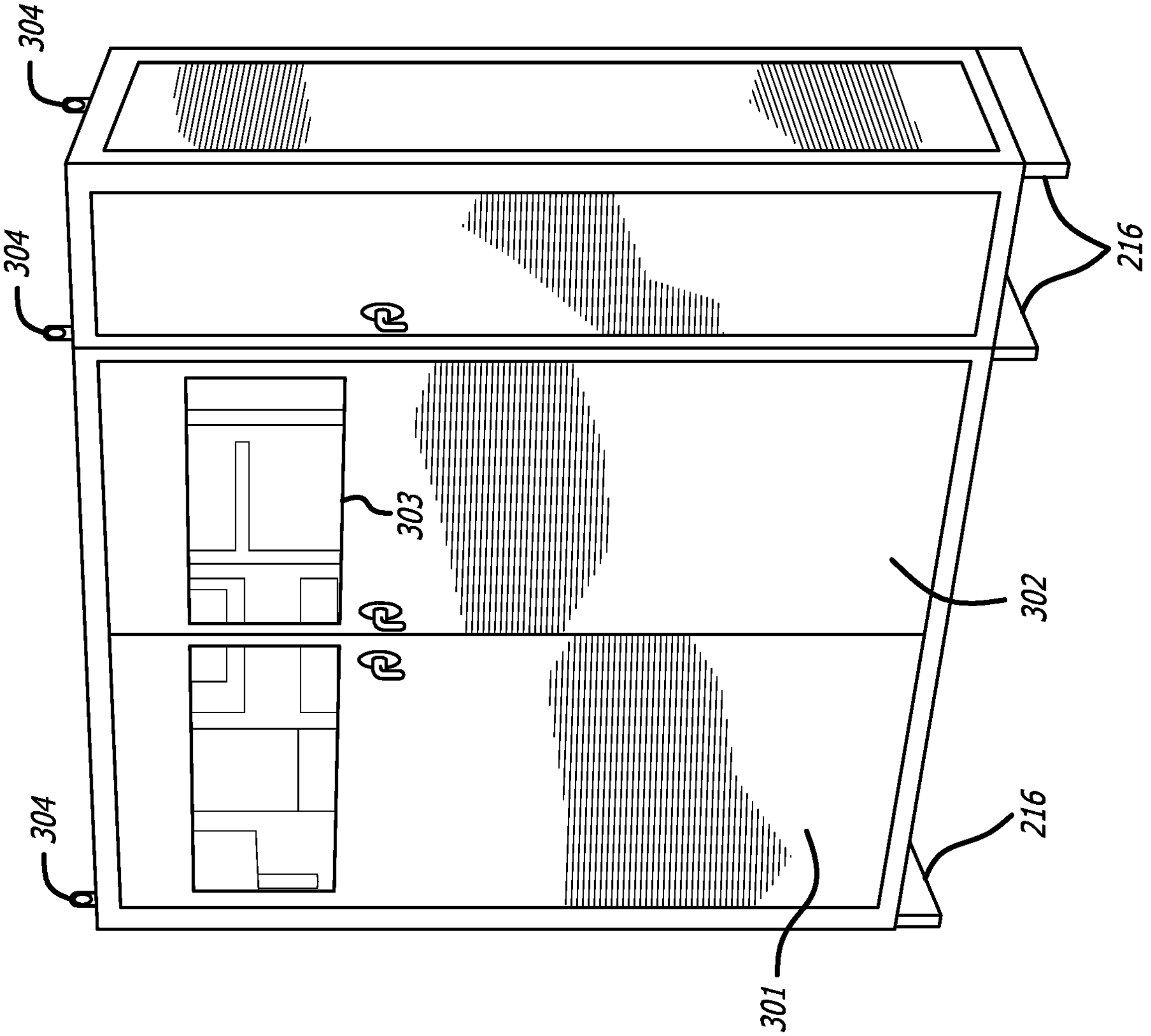
FIG. 3 is an embodiment of the system with doors.

In one embodiment, the panel includes double doors 301 as shown in FIG. 3 to further protect the system. The doors may have windows 303 so that visual monitoring of the system may take place without compromising the environmental protection that the doors provide. On the doors there will be a dashboard or other display to indicate system status. In one embodiment, the doors include 3 point locking handles 302 (e.g. T handles). The doors 301 include gaskets and seals to provide additional environmental isolation of the cabinet 201.

As show in FIG. 3, the cabinet 201 includes integrated mounting eyes 304 for mounting and stabilizing the cabinet against a wall. Other mounting locations can be integrated into the system without departing from the scope and spirit of the system.

The system is scalable, and it is contemplated that additional cabinets and compartments can be attached and integrated into the system as needed, both at the assembly location or the installation location.

When the detection devices detect an event, there is a set of contact closures that will start off a chain of events. Remote alarms in local and off site or manned supervisory points will receive annunciation from the panel. The panel will energize a solenoid to allow high pressure gas to open the pilot bottle valves to allow gas to flow to the panel. At that time the control system will signal an end drive to rotate and control a needle valve or a pressure reducing device to maintain and to adjust the amount of gas to be delivered as appropriate. At the same time the water solenoid opens and pressurized water flows to the emitter with the gas and is educted, emulsified and a fine mist is created to suppress the alarmed event.

What is claimed is:

1. An integrated fire suppression system, comprising:

a cabinet including a plurality of environmentally isolated compartments;

a first walled compartment of the plurality of environmentally isolated compartments received with and mounting a plurality of fire suppression control systems including at least one of electrical components and controls coupled to at least one of water and gas solenoids, high pressure tank nozzles, and an emitter;

a second walled compartment of the plurality having at least one of fluid storage and high pressure gas components, and isolating fluids and gas therein by a sealing mechanism disposed in an opening between the first and second walled compartments;

a third walled compartment of the plurality further including solenoid and actuator systems; and at least one high pressure tank disposed in both the first and second walled compartments, wherein the tank includes a nozzle that extends through the opening and sealing mechanism and into the second walled compartment.

2. The system of claim 1, further comprising:
the cabinet securely mounts heavier components contained therein on a bottom of at least one of the first and second walled compartments, to stabilize the cabinet with the mass of such components.

3. The system of claim 1, further comprising:
the at least one of fluid storage and high pressure gas components include high pressure tanks that are the heaviest components of the cabinet, and which are positioned to have respective centers of gravity arranged at the lowest point within the cabinet, to stabilize the cabinet with the mass of the tanks.

4. The system of claim 1, further comprising:
at least one emitter nozzle mounted to the cabinet to extend into an exterior environment and configured to enable emission of fire suppressant during operation.

5. The system of claim 1, further comprising:
a plurality of preinstalled interconnects extending exteriorly from the cabinet, including at least one electrical, communication, and plumbing interconnect, each configured to connect components of the cabinet to exterior infrastructure.

6. The system of claim 1, further comprising:
the emitter control configured to connect with and control an exterior high velocity, low pressure fire suppression system.

7. The system of claim 1, further comprising:
the cabinet including a plurality of feet extending from a bottom of the cabinet, and configured to elevate the cabinet above a ground surface upon installation.

8. The system of claim 1, further comprising:
the sealing mechanisms include at least one of a gasket and a grommet.

9. The system of claim 1, further comprising:
a plurality of doors each having seals configured to environmentally isolate each compartment from the others, when the doors are closed, and from an exterior environment.

10. The system of claim 1, further comprising:
the cabinet including at least two doors each having seals configured to isolate each compartment from the other and an exterior environment, when the doors are closed, such that a first door isolates the first compartment from the others, and a second door isolates the second and third compartments from each other and the first compartment.

11. An integrated fire suppression system, comprising:
a cabinet including three compartments defined by walls that isolate the compartments from each other and an exterior environment;
the first walled compartment mounting a plurality of fire suppression control systems including at least one of electrical components and controls coupled with at least one of water and gas solenoids, high pressure tank nozzles, and an emitter;
the second walled compartment having at least one of fluid storage and high pressure gas components, and isolating fluids and gas within the compartment by a sealing mechanism disposed in an opening between the first and second walled compartments;
the third walled compartment further including solenoid and actuator systems; and
at least one high pressure tank disposed in both the first and second walled compartments, wherein the tank includes a nozzle that extends through the opening into the second walled compartment.

12. The system of claim 11, further comprising:
the cabinet including at least two doors each having seals configured to isolate each compartment from each other and the exterior environment when the doors are closed, such that a first door isolates the first compartment, and a second door isolates the second and third compartments.

13. The system of claim 11, further comprising:
the at least one of fluid storage and high pressure gas components include high pressure tanks that are the heaviest components of the cabinet, and which are positioned to have respective centers of gravity arranged at the lowest point within the cabinet, to stabilize the cabinet with the mass of the tanks.

14. The system of claim 11, further comprising:
at least one emitter nozzle mounted to the cabinet to extend into the exterior environment and configured to enable emission of fire suppressant thereto during operation.

15. The system of claim 11, further comprising:
a plurality of preinstalled interconnects extending exteriorly from the cabinet, including at least one electrical, communication, and plumbing interconnect, each configured to connect components of the cabinet to exterior infrastructure.

16. The system of claim 11, further comprising:
the emitter control configured to connect with and control an exterior high velocity, low pressure fire suppression system.

17. An integrated fire suppression system, comprising:
a cabinet including three compartments defined by walls and doors configured, when the doors are closed, to isolate the compartments from each other and an exterior environment;
the first walled compartment mounting a plurality of fire suppression control systems including at least one of electrical components and controls coupled with at least one of water and gas solenoids, high pressure tank nozzles, and an emitter;
the second walled compartment having at least one of fluid storage and high pressure gas components, and isolating fluids and gas within the compartment by a sealing mechanism disposed in an opening between the first and second walled compartments;
the third walled compartment further including solenoid and actuator systems; and
at least one high pressure tank disposed in both the first and second walled compartments, wherein the tank includes a nozzle that extends through the opening into the second walled compartment.

18. The system of claim 17, further comprising:
the doors each having seals configured to environmentally isolate each compartment from each other and the exterior environment, such that a first door isolates the first compartment from the others, and at least one additional door isolates the other compartments.

19. The system of claim 17, further comprising:
the at least one of fluid storage and high pressure gas components include high pressure tanks that are the heaviest components of the cabinet, and which are positioned to have respective centers of gravity arranged at the lowest point within the cabinet, to stabilize the cabinet with the mass of the tanks.

20. The system of claim 17, further comprising:
at least one emitter nozzle mounted to the cabinet to extend into the exterior environment and configured to enable emission of fire suppressant thereto during operation.

* * * * *